Figure 1:
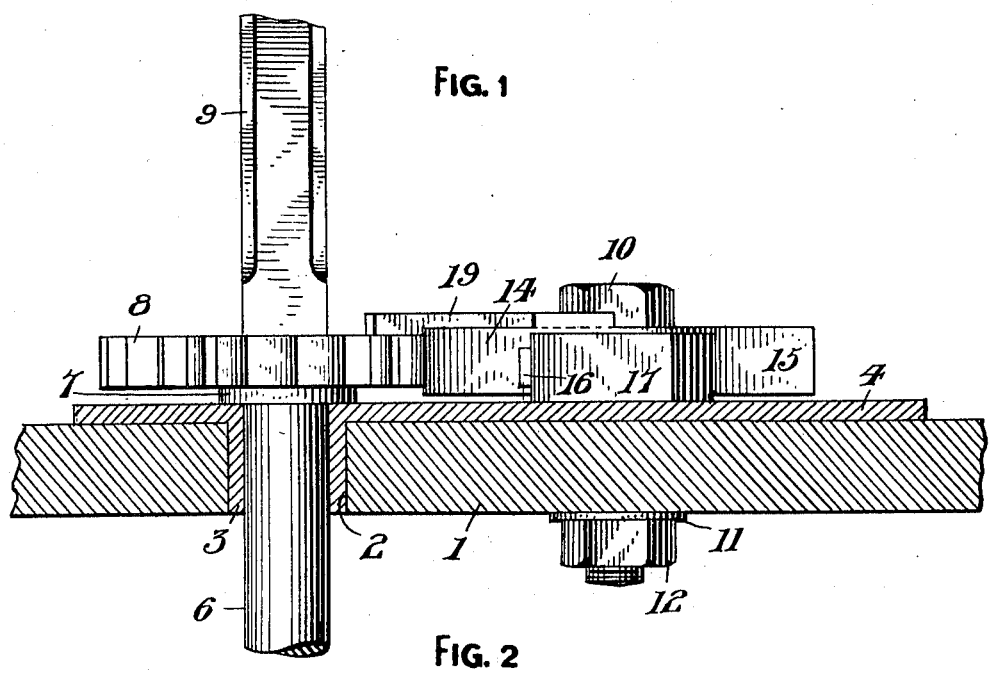

G. E. VAUSE & C. S. CLEMMENS.
BRAKE LOCKING DEVICE.
APPLICATION FILED SEPT. 28, 1911.

1,021,020.

Patented Mar. 26, 1912.

WITNESSES

INVENTORS
George E. Vause
Charles S. Clemmens
BY
ATTORNEYS

UNITED STATES PATENT OFFICE.

GEORGE E. VAUSE AND CHARLES S. CLEMMENS, OF PITTSBURGH, PENNSYLVANIA.

BRAKE-LOCKING DEVICE.

1,021,020.  Specification of Letters Patent.  Patented Mar. 26, 1912.

Application filed September 28, 1911. Serial No. 651,702.

*To all whom it may concern:*

Be it known that we, GEORGE E. VAUSE and CHARLES S. CLEMMENS, citizens of the United States of America, residing at Pittsburgh, in the county of Allegheny and State of Pennsylvania, have invented certain new and useful Improvements in Brake-Locking Devices, of which the following is a specification, reference being had therein to the accompanying drawing.

This invention relates to a brake locking device, and the primary object of our invention is to provide a brake shaft with a device that will normally retain the shaft in a locked position, thereby preventing the brake shaft from accidentally unwinding.

Another object of this invention is to provide a brake locking device that will prevent displacement of the brake shaft or the ratchet wheel carried thereby, the device being normally retained in operative relation relatively to the brake shaft.

A further object of this invention is to provide a brake locking device that is simple in construction, durable and highly efficient for the purposes for which it is intended.

With the above and other objects in view, the invention resides in the novel construction, combination and arrangement of parts to be hereinafter specifically described and then claimed.

Reference will now be had to the drawing, wherein:—

Figure 2:
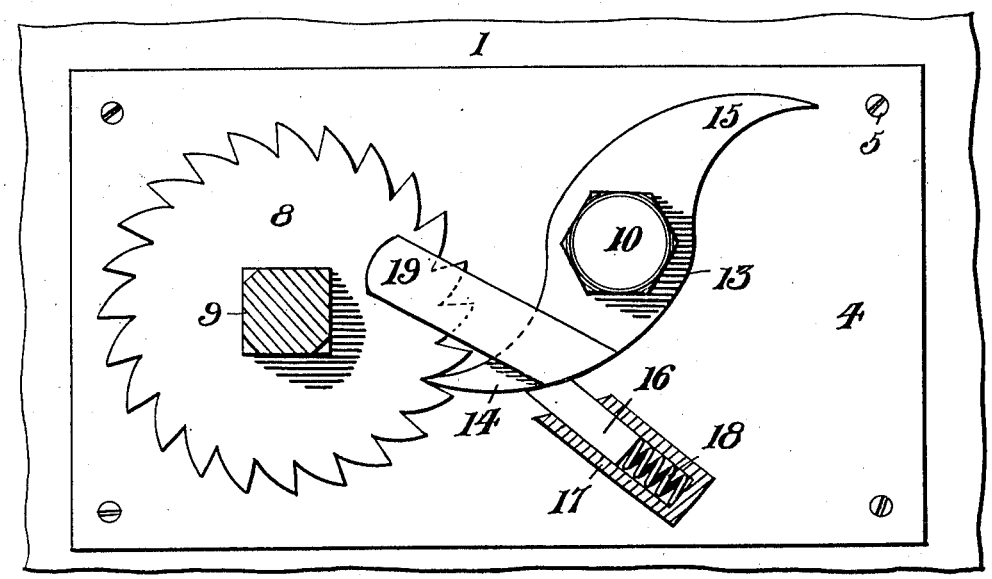

Figure 1 is a side elevation of the brake locking device, and Fig. 2 is a plan of the same, partly broken away and partly in section.

The reference numeral 1 denotes a platform or other support having a vertical opening 2 for the bushing 3 of a base plate 4, said base plate being screwed or otherwise connected to the platform 1, as at 5.

The reference numeral 6 denotes a brake shaft journaled in the bushing 3, said shaft having a collar 7 resting upon the base plate 4 and a ratchet or toothed wheel 8 directly above the collar 7. The upper end of the shaft 6 terminates in a rectangular portion 9 adapted to accommodate a crank, handle or hand wheel, whereby said brake shaft can be easily rotated.

Extending through the base plate 4 and the platform 1, adjacent to the shaft 6, is a pivot bolt 10 provided with a washer 11 and a nut 12. This pivot bolt movably supports a dog or pawl 13 having a tooth 14 to engage the wheel 8 and a toe-piece 15. The tooth 14 is normally retained in engagement with the wheel 8 by a plunger 16 arranged in a housing 17, adjacent to the dog or pawl 13. The plunger 16 is normally retained in engagement with the toothed end of the dog or pawl 13 by a coiled compression spring 18 arranged within the housing 17 and engaging the inner end of the plunger 16.

The toothed end 14 of the dog or pawl 15 has the upper side thereof provided with an extension 19 that protrudes over the wheel 8 and prevents vertical displacement of said wheel upon the rectangular portion 9 of the shaft 6. The extension 19 is arranged whereby it will protrude over the ratchet wheel 8 with the toothed end 14 of the dog or pawl either in or out of engagement with said wheel, and this extension serves functionally as a guide for guiding the toothed end of the dog or pawl into engagement with the teeth of the wheel 8.

A pressure of the foot against the toe-piece 15 of the dog or pawl shifts the toothed end thereof out of engagement with the wheel 8, should it be desired to release the brakes held by the brake shaft 6. It is obvious that the brakes can be set by winding the shaft 6 as the toothed end 14 of the dog or pawl will recede over the teeth of the wheel 8 in the ordinary and well known manner.

The brake locking device in its entirety can be made of light and durable metal, and while in the drawing there is illustrated a preferred embodiment of the invention, it is to be understood that the structural elements thereof are susceptible to such changes as fall within the scope of the appended claims.

What we claim is:—

1. In a brake locking device, a base plate provided with a depending boss, a support into which said boss extends and upon which said plate is mounted, a brake staff extending through said plate and boss, a ratchet wheel carried by said staff and spaced from said plate, a dog pivoted upon said plate and having one end capable of engaging said ratchet wheel to prevent movement of the staff and having its outer end forming a toe-piece whereby the dog can be shifted by the foot clear of the ratchet wheel, an inclined housing carried by said plate, a spring controlled inclined plunger mounted in the housing and permanently engaging one side of said dog and for normally tending to force the dog into engagement with said wheel, and an inclined flat extension integral with the upper face of that end of said dog which engages with said wheel and permanently projecting over said wheel to prevent vertical displacement of the latter.

2. In a brake locking device, a base plate, a brake staff extending through said plate and provided with a collar engaging the upper surface of the plate, a ratchet wheel carried by said staff and positioned against said collar, a dog pivoted upon said plate and having one end engaging said ratchet wheel to prevent movement of said staff and having its other end forming a toe-piece whereby the dog can be shifted from engagement with the ratchet wheel, a housing carried by said plate, a spring controlled plunger mounted in said housing and permanently engaging one side of said dog for normally maintaining the dog in engagement with the teeth of said wheel, and a flat extension integral with the upper face of that end of said dog which engages with said wheel and permanently projecting over said wheel to prevent vertical displacement of the latter.

In testimony whereof we affix our signatures in the presence of two witnesses.

GEORGE E. VAUSE.
CHARLES S. CLEMMENS.

Witnesses:
  MAX H. SROLOVITZ,
  CHRISTINA T. HOOD.

---

Copies of this patent may be obtained for five cents each, by addressing the "Commissioner of Patents, Washington, D. C."